United States Patent Office 3,687,804
Patented Aug. 29, 1972

3,687,804
COMPACT AND SAFE NUCLEAR REACTOR
Carroll B. Mills and Robert I. Brasier, Los Alamos, N. Mex., assignors to the United States of America as represented by the United States Atomic Energy Commission
Continuation-in-part of application Ser. No. 833,932, June 17, 1969. This application Oct. 27, 1971, Ser. No. 192,950
Int. Cl. G21c 1/06
U.S. Cl. 176—50
3 Claims

ABSTRACT OF THE DISCLOSURE

A compact, lightweight and low cost nuclear power reactor that is safe to build and operate. The reactor core contains the absolute minimum critical mass for the nuclear fuel used and any change in materials or geometry will reduce the reactivity of the assembly. A beryllium reflector surrounds the core and a liquid moderator-coolant circulates through and around it. The device is enclosed in a pressure shell and control is accomplished by state of the art means. The core can be chemically processed and fabricated in one lot and the reactor will not become critical until the core is surrounded by the beryllium reflector and filled with the liquid moderator-coolant.

CROSS REFERENCE TO RELATED APPLICATIONS

This application is a continuation-in-part of S.N. 833,932 filed June 17, 1969.

BACKGROUND OF THE INVENTION

The invention described herein was made in the course of, or under, a contract with the U.S. Atomic Energy Commission.

This invention relates to the field of nuclear power reactors and more particularly relates to a compact reactor that is much safer than reactors of the prior art. The term "minimum critical mass" will be used in the description of this invention; therefore, some information about the term will aid in obtaining a more comprehensive understanding of the invention. The critical mass of a reactor is that mass of fissionable fuel which determines that the number of neutrons produced in the fission process just balances those lost by escape and capture. The minimum critical mass is the absolute minimum or least amount of fissionable fuel necessary for critical mass under any possible set of conditions. The minimum critical mass concept resulted from an extension of reactor physics into a range of critical mass values lower than any previously known.

Reactors of the prior art have included safety hazards in their construction. Many safety features have been developed to combat these hazards but an optimum system has not yet been developed. One of the most important reactor safety features is a built-in safety design. This is a reactor that will shut down should anything go wrong. An example of this is the negative temperature coefficient concept whereby the reactor tends to shut itself down as the temperature increases. Because prior art reactors have used fuel amounts well above the minimum critical mass and in concentrations such that dimensional or composition changes due to accidents can cause a more critical geometry to be developed, these safety features have conceptual problems as well as practical difficulties. A structural breakdown might isolate a portion of the reactor from any further adjustment in a control sense and that portion could be a supercritical mass. Mechanical deformation resulting in local compression of the fuel, loss of coolant, etc. could conceivably cause a hazardous nuclear transient. A further hazard is that the fuel element could not be chemically processed and fabricated in one lot because the critical mass of the reactor was normally many times larger than the minimum critical mass, so it could be supercritical at several stages in the handling sequence. For the same reason, care had to be taken that the multiple parts of fuel element were not allowed to become so closely associated that a critical mass was formed. Extreme care was also required to prevent reflector and moderator materials from becoming associated with the fuel in a manner that would produce dangerous geometries.

SUMMARY OF THE INVENTION

The reactor of this invention is for a very special nuclear power supply that is at an extremum in simplicity, safety, and so cost and general usefulness in low power applications. It must use a beryllium reflector, be cooled by light water, use less than 800 grams of uranium-235 but more than 400 grams of uranium-235, and may be fabricated with the core a single unit structure.

The reactor of the present invention overcomes many of the disadvantages of the prior art because any gross accidental change in materials or geometry will reduce the reactivity of the assembly. Before the reactor can go critical, the following conditions must be simultaneously met: the core must be surrounded by a beryllium metal reflector, and it must be filled with the liquid moderator-coolant. Since the fuel is near the minimum critical mass, any change other than in a control device will tend to reduce reactivity.

The smallest power producing reactors of the prior art have, in general, fuel cores of at least 1000 grams. The reactor of this invention has a fuel core well below that amount. For comparison purposes, it can be stated that any reactor incorporating the fundamentals of this invention will have a fuel amount in the range of 400 to 800 grams. The fuel amount of this invention is the minimum critical mass for the fuel used, plus an allowance for the various other factors required in an operating reactor. The additional amounts of fuel are determined by such things as the amount required for temperature compensation, for the poisoning effect of the structural elements, the poison effect of the changing fuel composition due to fission product formation, and for fuel burnup.

It is therefore an object of this invention to provide a reactor that is safe to build and operate.

It is a further object of the invention to provide a reactor that is compact, low cost, and lightweight.

DESCRIPTION OF THE PREFERRED EMBODIMENT

Figure 1:
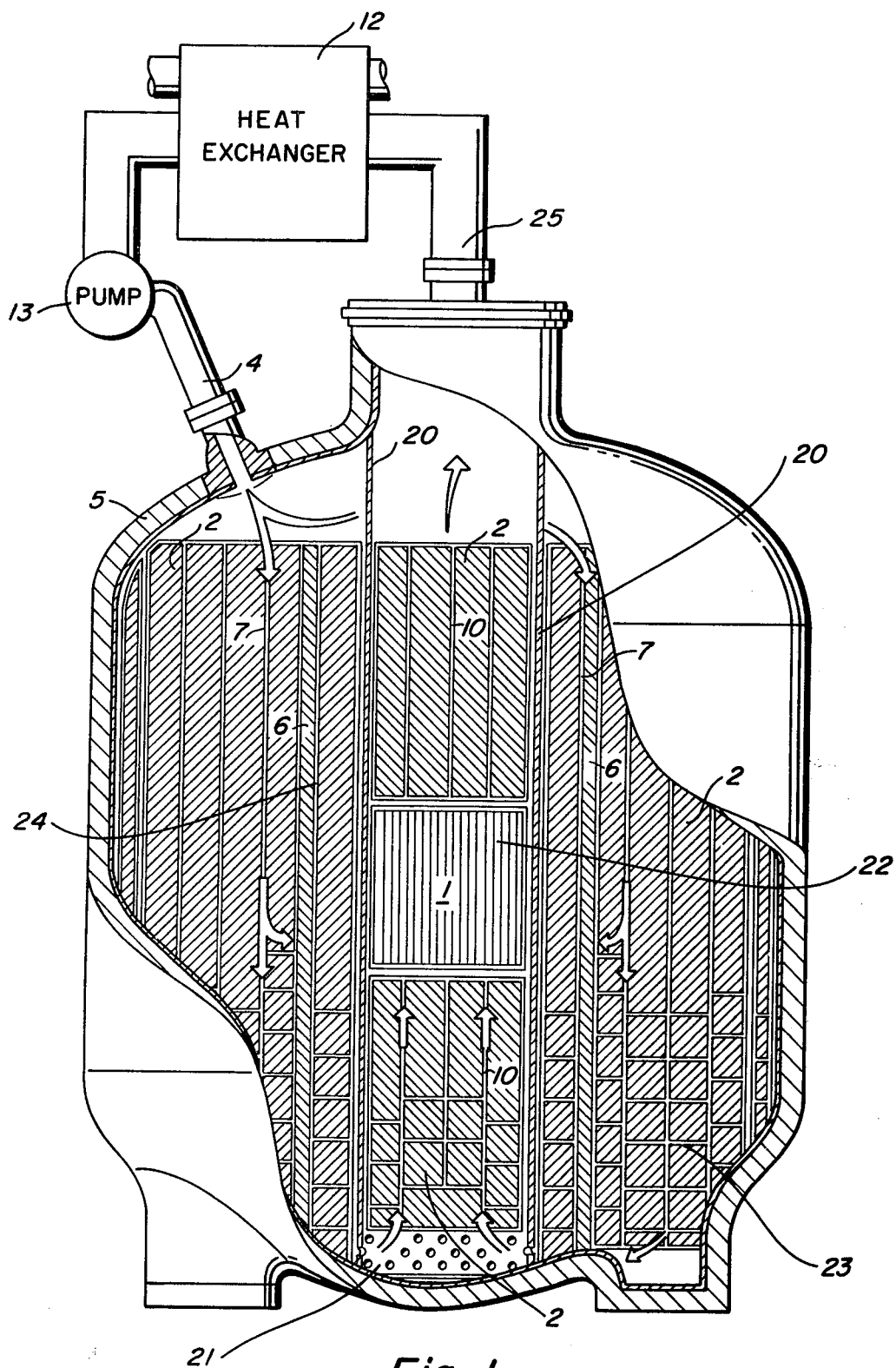
FIG. 1 shows, in partial section, one embodiment of this invention.

The reactor shown in FIG. 1 is designed to operate at power levels up to 500 kilowatts thermal with water coolant at a temperature of 500–600° F. and a pressure of 1200–1500 p.s.i. If a temperature rise of 70° F. is allowed through the reactor, a flow rate of ∼54 gallons per minute would be required. The fuel consists of from 400–800 grams of enriched (93–94% uranium-235) uranium in the form of uranium oxide contained in the cylindrical core 1. The core 1 is surrounded by a beryllium metal reflector 2 with a thickness of about 12 inches. In addition there is a conventional core structure element 20 which supports the positioning of the core 1 and provides an overall channel for the return of coolant after passing through the reflector 2 and core 1. Water is used as the coolant and works effectively as a moderator. The water enters at inlet 4, circulates through a system of inlet passages 7, lower horizontal reflector coolant passages 23, coolant dispersion element 21, fuel element coolant channels 22, outlet passages 10, and exits at outlet 25. The balance of the primary circuit consists of a conventional heat exchanger 12 and pump 13. The containment vessel 5 is 34 inches in diameter and may be as little as 34 inches in length. The amount of fuel used including allowance for the various other factors required in an operating reactor is the minimum for criticality when the reactor is filled with water. Control of the reactor is accomplished by state of the art means and is shown as a moveable boron control element 6 which is cooled by flowing water through passage 24.

Figures 2, 5:
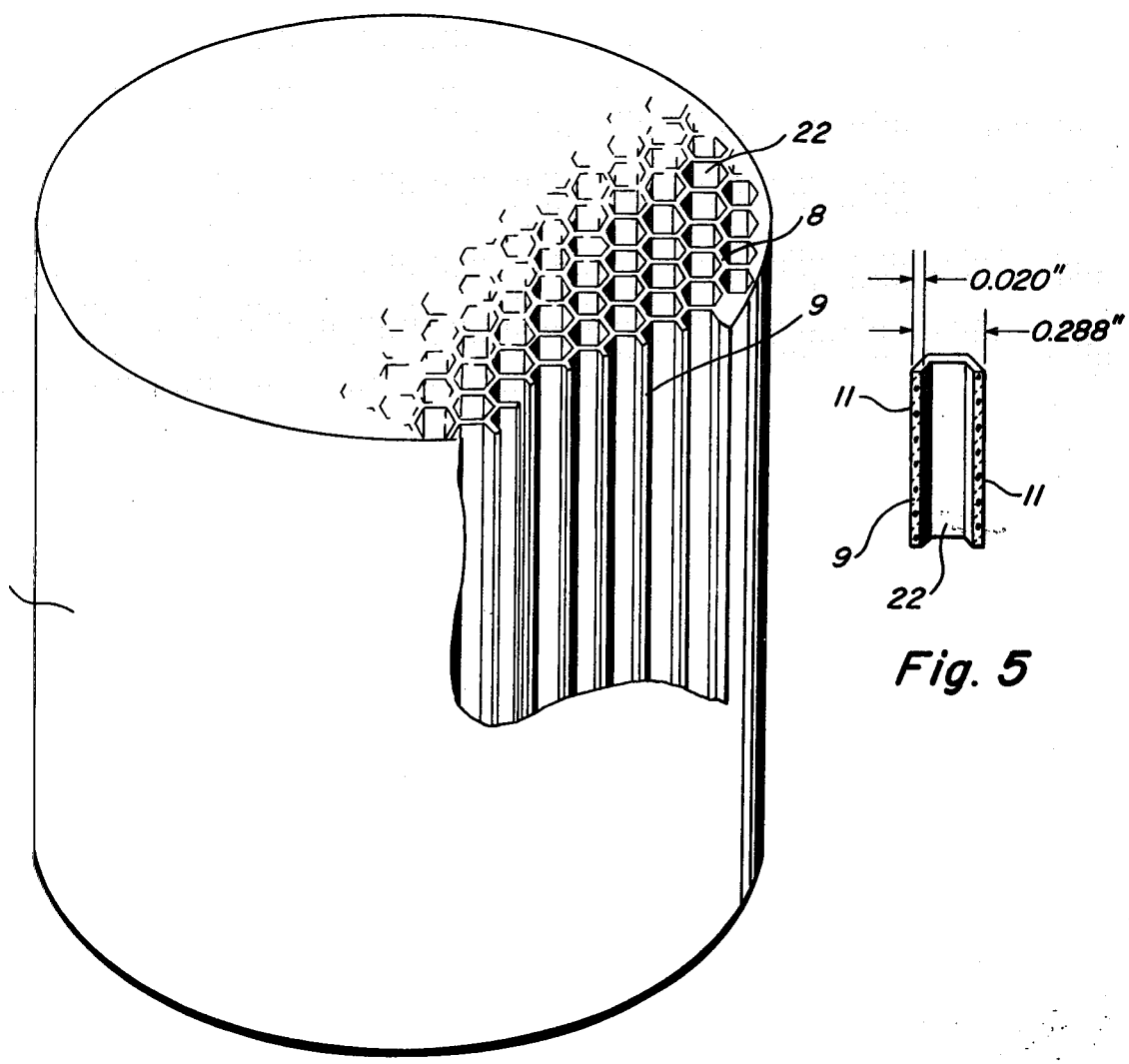
FIG. 2 is an isometric cutaway view of the core of the reactor shown in FIG. 1.
FIG. 5 is a partial cross section of the fuel element shown in FIG. 2.

The fuel, contained in a cylindrical core as shown in FIG. 2, is approximately eight inches in diameter and eight inches tall, consists of 400–800 grams of enriched (93–94% uranium-235) uranium in the form of uranium oxide. The $UO_2$ is mixed homogeneously with silicon carbide in fuel elements 8 consisting of 7% $UO_2$ and 93% SiC. The fuel element material 9 is thin enough, about 0.020 inch, to have adequate heat transfer and neutron self shielding properties. No theoretical minimum exists but current fabrication state of the art appears to limit the thickness to a few thousandths of an inch. Elements 8 are shaped in such a way as to ensure rigidity, create uniform interstitial coolant channels 22, contain a large moderator-volume fraction and approximate a homogeneous distribution of fuel. As shown in FIG. 2, the inventor has used a hexagonal shaped fuel element. The entire core is chemically processed and fabricated in one lot by state of the art processing and fabrication methods.

FIG. 5 shows a cross-sectional view of a fuel element 8 and in particular shows the coolant channel 22 and the loading of uranium-235 within the said element. This figure further shows the dimensions in the preferred embodiment of this invention as being approximately two hundredths of an inch thick and having a dimension of 28 hundredths of an inch across the points of the hexagonal element. The matrix 9 contains the uranium-235 dispersed throughout the core structure with said uranium totaling in the range of 400–800 grams. The fuel elements are in a single unified integral structure and are clad with a material that is the same as the matrix base material. This cladding 11 is typically only a few thousandths of an inch thick, and in this embodiment it would be SiC. The matrix material may be aluminum oxide, silicon carbide (as described in the preferred embodiment) or zirconium metal plus uranium-235 in the form of uranium dioxide. The cladding is the same as the matrix material, for example, zirconium metal with no uranium oxide addition.

Figure 3:
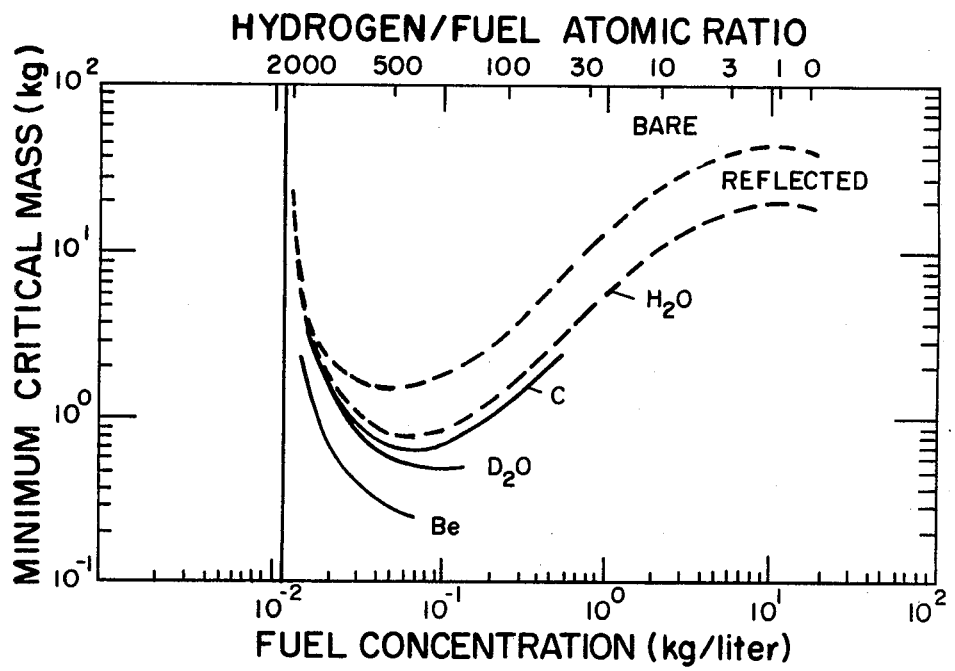
FIG. 3 shows the relationship between several of the best reflector materials and uranium-235 mass.

The graphical presentation of FIG. 3 compares reflector materials showing the minimum critical mass values for the fissionable isotope uranium-235 in a water solution. Referring to the graph, it is apparent that among the materials shown beryllium is the best reflector in terms of reducing critical mass and in actuality beryllium is the best reflector of all known materials. In addition, FIG. 3 indicates that use of beryllium as a reflector has inherent safety features because any other materials substitution or change replacement of the beryllium would reduce reactivity.

After deciding that beryllium is the ideal material for use as a reflector, it is necessary to determine the minimum critical mass for the fuel. Using well known multigroup neutron transport approximation ($S_n$) computing methods, the graphical presentation shown in FIG. 4 was prepared. The upper curve is the critical mass as a function of uranium-235 density (kg./liter) in $H_2O$-moderated and reflected solutions in spheres and the lower curve shows the corresponding values with a beryllium reflector.

Figure 4:
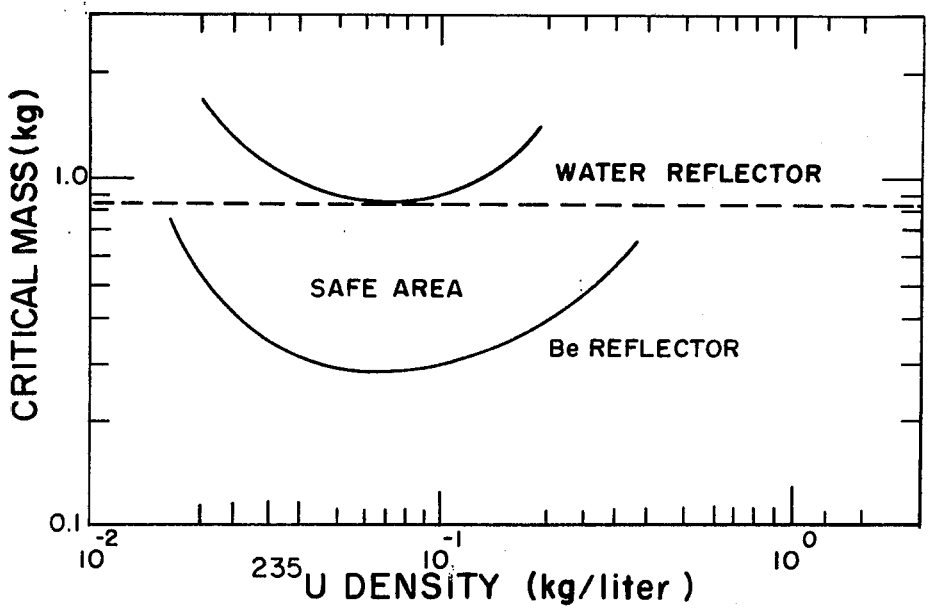
FIG. 4 shows the minimum critical mass for uranium-235 in a water solution and with a beryllium reflector.

By similar analyses, all utilizing methods well known in the art, it is possible to establish the necessary parameters for construction of safe reactors operating on other fuels such as uranium-233 or plutonium-239, other enrichments of uranium-235, other reflectors, and other fuel element materials for further cost reductions while remaining in the safe area shown in FIG. 4. "Minimum critical mass" is that amount of fissionable fuel as shown in FIGS. 3 and 4. All of the effects of material, geometry, and temperature have been adjusted to provide a minimum critical mass for each fuel concentration shown. The minimum fuel concentration is thus a minimum in a multitude of possibilities and is an absolute minimum. Addition of these other factors to permit a properly engineered design for power production, such as cylindrical instead of spherical geometry high water (moderator) temperature for energy removal, etc., increases this critical mass minimum to higher values, but values still on the minimum of the critical mass as concentration relation that is graphically illustrated.

In addition to the safety features of the reactor of this invention, other distinct advantages are important. By establishing minimum size parameters for a reactor, it is possible to design the associated equipment without it becoming obsolete because of changes in size of the power source. It can be seen that the reactor including mechanical attachments and pressure shell approximates the size of an average man.

Nuclear energy for power production holds great promise for the future. However, the acceptability and hence the ultimate utility of nuclear power depends to a great degree upon safety aspects. Government regulations regarding safety are constraints that must be considered when a reactor is being designed. Public opinion also plays an important role in the growth of the reactor industry and safety is a prime factor in public opinion.

This invention is intended to be basic and not dependent on description of components that may be any one of a large variety of shapes and compositions. As presently conceived, the fuel will be dispersed uniformly in a structure of symmetrical hexagonal shaped fuel element that is a low neutron absorption cross section material such as aluminum, silicon carbide, or zirconium. This is very easily fabricable and made of familiar, cheap material. Alternately, simple aluminum or silicon carbide flat or corrugated plates, or tubes, also homogeneously fuel loaded (e.g., uranium-235) may be used.

What we claim is:

1. A nuclear reactor comprising a fuel cylindrical core having more than 400 grams but less than 800 grams of enriched uranium, all of the fuel in said core consisting of said enriched uranium which is 93–94 percent by weight uranium-235 in the form of uranium oxide, a beryllium metal reflector surrounding said core, pump means to circulate a moderator-coolant fluid consisting of light water through and around said core and through a heat exchanger, and a pressure shell surrounding said reflector.

2. The reactor of claim 1 wherein the cylindrical core consists of a unitary fuel matrix having a plurality of walls integrally formed in a honeycomb pattern and forming uniform interstitial coolant channels therein, each of said walls having a wall thickness of about 0.20 inch, and said core being approximately 8 inches in diameter and 8 inches high.

3. The reactor of claim 1 in which the said pressure shell is about 34 inches in diameter and 34 inches in height.

References Cited

UNITED STATES PATENTS

| 3,383,858 | 5/1968 | Willinski et al. | 176—39 |
| 3,262,820 | 7/1966 | Whitelaw | 176—39 |
| 3,449,208 | 6/1969 | Balent et al. | 176—50 |
| 3,164,525 | 1/1965 | Wetch et al. | 176—33 |

CARL D. QUARFORTH, Primary Examiner

H. E. BEHREND, Assistant Examiner

U.S. Cl. X.R.

176—39, 68, 78